US007783727B1

(12) United States Patent
Foley et al.

(10) Patent No.: US 7,783,727 B1
(45) Date of Patent: Aug. 24, 2010

(54) DYNAMIC HOST CONFIGURATION PROTOCOL IN A STORAGE ENVIRONMENT

(75) Inventors: Michael Foley, Easton, MA (US); Mohamad Chedadeh, Watertown, MA (US); Quang Vu, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 2113 days.

(21) Appl. No.: 09/944,288

(22) Filed: Aug. 30, 2001

(51) Int. Cl.
*G06F 15/177* (2006.01)

(52) U.S. Cl. .............. 709/220; 709/221; 709/222; 709/227; 709/228; 711/152; 711/162; 711/163; 711/164

(58) Field of Classification Search ......... 709/220–222, 709/227, 228
See application file for complete search history.

(56) References Cited

U.S. PATENT DOCUMENTS

| | | | | |
|---|---|---|---|---|
| 5,349,643 A * | 9/1994 | Cox et al. | ............. | 713/155 |
| 5,404,527 A * | 4/1995 | Irwin et al. | ............. | 709/222 |
| 5,485,579 A * | 1/1996 | Hitz et al. | ............. | 709/221 |
| 5,594,903 A * | 1/1997 | Bunnell et al. | ............. | 717/162 |
| 5,838,907 A * | 11/1998 | Hansen | ............. | 709/220 |
| 5,922,072 A * | 7/1999 | Hutchinson et al. | ............. | 713/2 |
| 5,926,631 A * | 7/1999 | McGarvey | ............. | 703/23 |
| 6,009,474 A * | 12/1999 | Lu et al. | ............. | 709/245 |
| 6,112,301 A * | 8/2000 | Johnson | ............. | 713/1 |
| 6,167,494 A * | 12/2000 | Cheston et al. | ............. | 711/162 |
| 6,175,917 B1 * | 1/2001 | Arrow et al. | ............. | 713/1 |
| 6,185,623 B1 * | 2/2001 | Bailey et al. | ............. | 709/238 |
| 6,292,941 B1 * | 9/2001 | Jollands | ............. | 717/176 |
| 6,343,287 B1 * | 1/2002 | Kumar et al. | ............. | 707/4 |
| 6,343,324 B1 * | 1/2002 | Hubis et al. | ............. | 709/229 |
| 6,421,723 B1 * | 7/2002 | Tawil | ............. | 709/224 |
| 6,496,914 B1 * | 12/2002 | Vook et al. | ............. | 711/170 |
| 6,505,084 B2 * | 1/2003 | Blumenstock | ............. | 700/21 |
| 6,543,004 B1 * | 4/2003 | Cagle et al. | ............. | 714/15 |
| 6,587,959 B1 * | 7/2003 | Sjolander et al. | ............. | 714/4 |
| 6,633,962 B1 * | 10/2003 | Burton et al. | ............. | 711/163 |
| 6,654,797 B1 * | 11/2003 | Kamper | ............. | 709/220 |
| 6,687,820 B2 * | 2/2004 | French et al. | ............. | 713/2 |
| 6,735,625 B1 * | 5/2004 | Ponna | ............. | 709/223 |
| 6,751,658 B1 * | 6/2004 | Haun et al. | ............. | 709/222 |
| 6,754,718 B1 * | 6/2004 | Dobberpuhl et al. | ............. | 709/250 |
| 6,775,830 B1 * | 8/2004 | Matsunami et al. | ............. | 717/176 |
| 6,799,255 B1 * | 9/2004 | Blumenau et al. | ............. | 711/152 |
| 6,810,478 B1 * | 10/2004 | Anand et al. | ............. | 713/2 |
| 6,834,299 B1 * | 12/2004 | Hamilton et al. | ............. | 709/220 |
| 6,842,877 B2 * | 1/2005 | Robarts et al. | ............. | 715/708 |
| 6,865,728 B1 * | 3/2005 | Branson et al. | ............. | 717/108 |

(Continued)

*Primary Examiner*—John Follansbee
*Assistant Examiner*—Backhean Tiv
(74) *Attorney, Agent, or Firm*—Ballard Spahr LLP

(57) ABSTRACT

A diskless host computer is automatically configured upon adding it to storage-area network (SAN). Upon physically connecting the diskless host computer to the network, the host computer alerts the network and a control station of its presence. A suitable identifier provided by the host, such as a Fibre Channel World Wide Name, is used to look up a configuration corresponding to a host of its type. Configurations corresponding to all types of hosts expected to be connected to the network are pre-stored in the SAN data storage system. Each configuration includes an operating system and can include any other software related to configuring or installing a new host. The control station then provides access to a storage device on which the operating system is stored so that the host can boot from it or access it for any other purposes.

12 Claims, 3 Drawing Sheets

U.S. PATENT DOCUMENTS

| | | | |
|---|---|---|---|
| 6,880,058 B2* | 4/2005 | Mizuno et al. | 711/170 |
| 6,968,463 B2* | 11/2005 | Pherson et al. | 726/3 |
| 7,082,462 B1* | 7/2006 | Matsunami et al. | 709/223 |
| 7,165,152 B2* | 1/2007 | Blumenau et al. | 711/152 |
| 7,203,730 B1* | 4/2007 | Meyer et al. | 709/213 |
| 7,206,832 B2* | 4/2007 | Matsunami et al. | 709/223 |
| 7,219,189 B1* | 5/2007 | Ryu et al. | 711/111 |
| 7,222,176 B1* | 5/2007 | Laurent et al. | 709/226 |
| 7,260,636 B2* | 8/2007 | Blumenau et al. | 709/227 |
| 7,293,147 B2* | 11/2007 | Tanaka et al. | 711/163 |
| 7,370,104 B2* | 5/2008 | Matsunami et al. | 709/223 |
| 7,379,987 B2* | 5/2008 | Ishizaki et al. | 709/223 |
| 7,395,324 B1* | 7/2008 | Murphy et al. | 709/223 |
| 7,398,273 B2* | 7/2008 | Dobberpuhl et al. | 1/1 |
| 7,506,040 B1* | 3/2009 | Rabe et al. | 709/223 |
| 7,552,209 B2* | 6/2009 | Matsunami et al. | 709/223 |
| 2001/0018717 A1* | 8/2001 | Shimotono | 709/319 |
| 2001/0047460 A1* | 11/2001 | Kobayashi et al. | 711/162 |
| 2002/0059263 A1* | 5/2002 | Shima et al. | 707/100 |
| 2002/0073249 A1* | 6/2002 | French et al. | 710/8 |
| 2002/0073303 A1* | 6/2002 | French et al. | 713/1 |
| 2002/0078128 A1* | 6/2002 | Peshkin | 709/201 |
| 2002/0087854 A1* | 7/2002 | Haigh et al. | 713/1 |
| 2002/0103889 A1* | 8/2002 | Markson et al. | 709/223 |
| 2002/0129230 A1* | 9/2002 | Albright et al. | 713/1 |
| 2002/0161596 A1* | 10/2002 | Johnson et al. | 705/1 |
| 2002/0161867 A1* | 10/2002 | Cochran et al. | 709/221 |
| 2002/0162010 A1* | 10/2002 | Allen et al. | 713/200 |
| 2004/0194084 A1* | 9/2004 | Matsunami et al. | 717/174 |
| 2005/0021727 A1* | 1/2005 | Matsunami et al. | 709/223 |
| 2005/0050191 A1* | 3/2005 | Hubis | 709/223 |
| 2005/0066125 A1* | 3/2005 | Tanaka et al. | 711/114 |
| 2007/0083635 A1* | 4/2007 | Matsunami et al. | 709/223 |
| 2008/0134171 A1* | 6/2008 | Matsunami et al. | 717/177 |
| 2008/0307040 A1* | 12/2008 | So | 709/203 |

* cited by examiner

DYNAMIC HOST CONFIGURATION PROTOCOL IN A STORAGE ENVIRONMENT

BACKGROUND OF THE INVENTION

1. Field of the Invention

The present invention relates generally to storage-area networks comprising diskless servers and computer data storage systems and, more specifically, to configuring a diskless server newly added to a storage-area network.

2. Description of the Related Art

The common computing system paradigm for business enterprises has evolved from stand-alone computers, each operated by an individual user, to client-server systems in which a remote server computer provides the computing power to service client computers operated by users via a network. Client-server systems vary widely in the distribution of computing power, storage and other resources between the client and the server. For example, in some client-server systems, clients are termed "thin clients" because resources are concentrated in the server. In others, clients are powerful workstations having substantial storage and processing resources.

Another shift in the computing paradigm has been toward a model in which data storage is centralized. Individual workstations or other servers throughout an enterprise are networked to a central data storage subsystem that they use to a greater extent than their internal hard disks or even to the exclusion of internal disks. In some systems, the servers are completely diskless, with operating system software, application programs and data all stored in the central data storage subsystem. The network may be referred to as a storage-area network (SAN). The SAN model is particularly attractive for data centers and similar enterprises in which a substantial number of servers needs access to a central repository of data. Storage products for such systems are commercially available from a variety of sources, such as EMC Corporation of Hopkinton, Mass. Systems are contemplated in which all of an enterprise's data storage needs are centralized, with the central data storage subsystem communicating remotely with diskless servers via a network protocol that supports communication over substantial distances, such as optical-media Fibre Channel. One advantage of diskless servers in a data center environment is that, if one fails, it can be quickly and easily replaced because there is no software to reinstall. Rather than having its operating system and other configuration software stored on a local disk, a diskless server dynamically obtains such software from the SAN during the boot process.

Installing new diskless servers in a data center environment, in which the enterprise may have many servers (hosts) running different operating systems, may tax the resources of a system administration department. If a server fails or otherwise needs to be replaced, or an additional server needs to be added, SAN ports and storage volumes must be assigned to the new host, and the operating system and application programs pertaining to the new host must then be installed on the SAN. This process often requires cooperation between the system administration department and a separate department in the enterprise that is charged with assigning ports and volumes and otherwise maintaining the central data storage devices. System administration personnel typically install operating systems and other software by loading from CD-ROMs or similar media or by using the so-called ghost image method by which software can be installed remotely via the network. Before beginning the installation process, such personnel must first identify the operating system that is to be installed and ensure that a copy is on hand. The overall process for adding a new host to a network can thus be time consuming and inefficient.

In contrast to the laborious process noted above for adding a new device to a SAN in a Fibre Channel or similar environment, adding devices to a network in an Internet Protocol (IP) network environment is increasingly easy with the advent of so-called "plug-and-play" concepts. In the Universal Plug and Play (UPnP) model, for example, promulgated by Microsoft Corporation, a newly connected device acts as a Dynamic Host Configuration Protocol (DHCP) client and searches the network for a DHCP server. DHCP is a mechanism for providing device configuration information needed to access the Internet. If a DHCP server is available, the device obtains an IP address from it. The device then advertises its services to control points on the network. Similarly, when a control point is added to the network, the UPnP discovery protocol allows that control point to search for devices of interest on the network.

It would be desirable to be able to add a diskless server to a SAN with essentially the same ease as adding a plug-and-play device to an IP-based network. The present invention addresses this problem and others in the manner described below.

SUMMARY OF THE INVENTION

The present invention relates to automatic configuration of a diskless host computer upon adding it to storage-area network (SAN). Upon physically connecting the diskless host computer to the network, the host computer alerts the network and a control station of its presence. The control station uses a suitable identifier provided by the host, such as a Fibre Channel World Wide Name, to look up a configuration corresponding to a host of its type. Configurations corresponding to all types of hosts expected to be connected to the network are pre-stored in the SAN data storage system. Each configuration includes an operating system and can include any other software related to configuring or installing a new host. The control station then provides access to a storage device on which the operating system is stored so that the host can boot from it or access it for any other purposes.

It is to be understood that both the foregoing general description and the following detailed description are exemplary and explanatory only and are not restrictive of the invention, as claimed.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION

Figure 1:
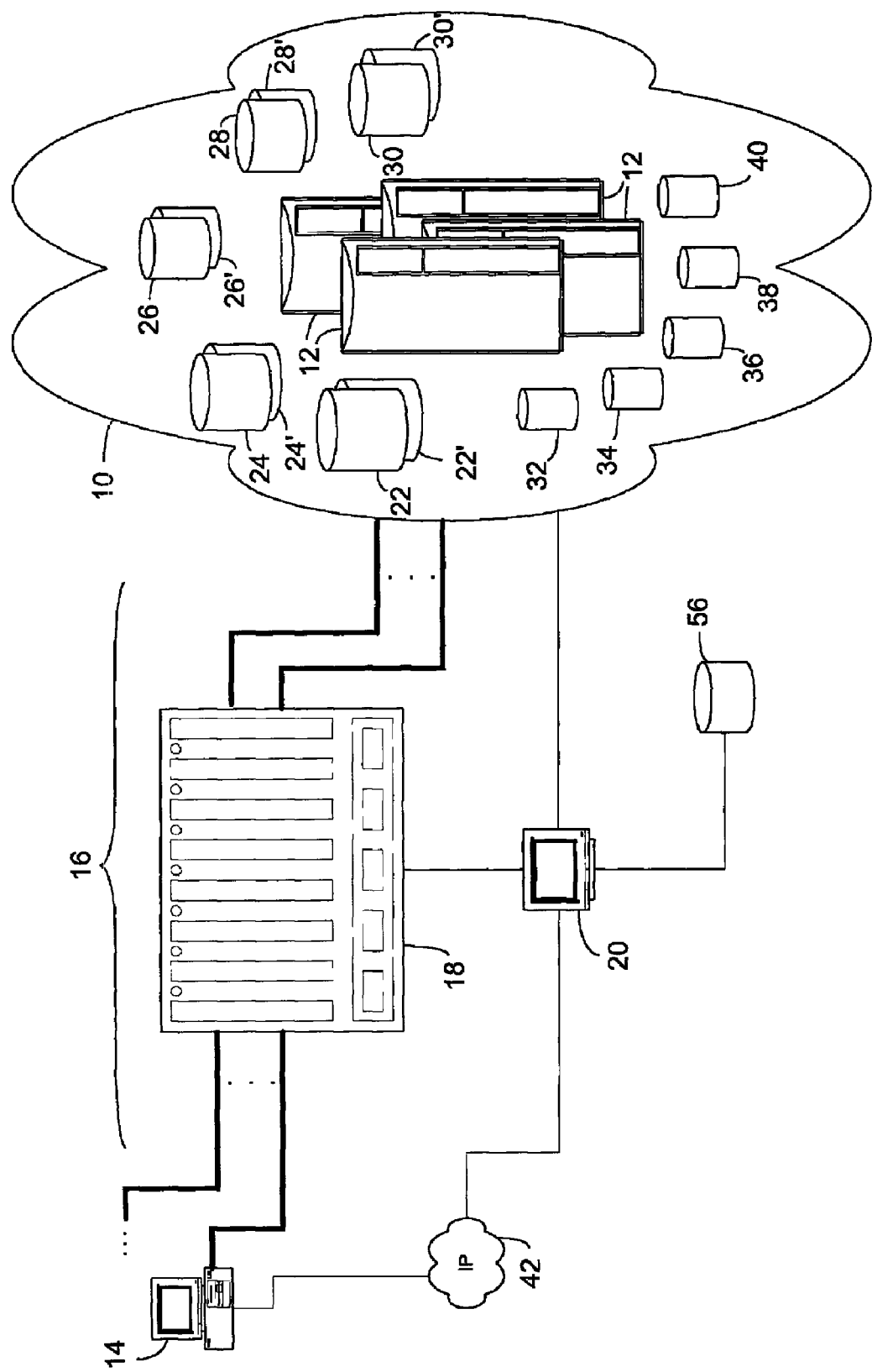
FIG. 1 illustrates a SAN in which, upon physical connection of a diskless host, a Fibre Channel switch automatically couples the host to a device in the storage system on which configuration software for such a host is stored.

As illustrated in FIG. 1, a storage-area network (SAN) cloud 10 includes one or more data storage systems 12 and can communicate with one or more diskless hosts 14 via a Fibre Channel network 16. Data storage system 12 can be any suitable mass storage platform, such as the SYMMETRIX line of products from EMC Corporation of Hopkinton, Mass. The SYMMETRIX is an enterprise data storage platform that includes the hardware and software necessary to serve the data storage needs of a business enterprise having many such hosts 14. The hardware includes an array of disk drives that typically have a collective storage capacity on the order of a terabyte or more. Nevertheless, the invention can be used in an environment having any suitable type of data storage system of any capacity. Note that hosts 14 are diskless; their persistent data storage needs are served entirely by SAN cloud 10 via Fibre Channel network 16. Because SAN cloud 10 is well-known in the art, its structure and operation are not described in further detail in this patent specification.

Fibre Channel network 16 is characterized by a Fibre Channel switch 18. A Fibre Channel switch is a well-known device commercially available from any of a number of manufacturers. Fibre Channel is a well-known network transport layer protocol that can be used with either optical (fiber) or electrical (copper wire) transmission media. For background information on the Fibre Channel standard, see ANSI X3.230-1994, "Fibre Channel—Physical and Signaling Interface" and related ANSI Fibre Channel standards. Fibre Channel can be used in various network topologies, but the topology created by using one or more switches 18 is known as a fabric. A well-known use of Fibre Channel is to allow several computers to share the same storage device. Therefore, this aspect of the illustrated system is not described in further detail in this patent specification.

Switch 18 has ports coupled (either directly or via one or more intermediate elements (not shown) of network 16) to SAN cloud 10, ports coupled to hosts 14, and one port coupled to a control station 20. Each port to SAN cloud 10 is associated with one of a number of individual logical storage devices 22, 24, 26, 28, 30, etc. As persons of skill in the art to which the invention pertains understand, switch 18 is of the crossbar type, such that any selected one of the ports to SAN cloud 10 can be connected to any selected one of the ports to hosts 14. Control station 20 provides control and port-selection signals to switch 18 that cause switch 18 to connect selected ports to each other, thereby connecting one of storage devices 22, 24, 26, 28 and 30 to one of hosts 14.

Note that the depiction of SAN cloud 10 as having devices 22, 24, 26, 28 and 30 separate from storage systems 12 is conceptual and for purposes of illustration; in actuality, devices 22, 24, 26, 28 and 30 are included in storage systems 12. Devices 22, 24, 26, 28 and 30 represent any suitable divisions of storage systems 12, whether physically separate disks or logically separate units or some combination thereof, that can be accessed independently of one another by hosts 14. Thus, the term "device" or "storage device" has the meaning commonly associated with it by persons of skill in the art. For reasons explained below, there is also a counterpart device 22', 24', 26', 28' and 30' to each of devices 22, 24, 26, 28 and 30. Counterpart devices 22', 24', 26', 28' and 30' are not necessarily physically adjacent or otherwise paired with devices 22, 24, 26, 28 and 30 in the manner shown; rather, they are conceptually shown that way in FIG. 1 for purposes of illustration.

Configuration data, including operating system software, is stored in each of devices 22, 24, 26, 28 and 30. Each stores configuration data different from that which the others store. The difference can be the operating system, with each storing a different operating system. For example, device 22 can store configuration data that includes a Sun Microsystems SOLARIS 7 operating system; device 24 can store configuration data that includes a SOLARIS 8 operating system; device 26 can store configuration data that includes a LINUX operating system, device 28 can store configuration that includes an AIX operating system, and so forth. Although SAN cloud 10 stores such configuration data for purposes of the present invention, its primary purpose is to store the data that relates to the enterprise's business activities. Those data are stored in still other devices 32, 34, 36, 38 and 40.

The invention relates to automatically, i.e., without further human intervention, configuring host 14 when a system administrator or other person first physically connects it to network 16. Host 14 can be any suitable diskless server or other diskless computer whose storage needs can be provided by SAN 10 via network 16. Network 16 can be of any suitable type, but in the illustrated embodiment is Fibre Channel because Fibre Channel is commonly used in SAN environments. It is anticipated that other protocols, such as Internet Protocol (IP), will come into widespread commercial use in SAN environments as well. Because in the illustrated embodiment network 16 is Fibre Channel, host 14 has a conventional Fibre Channel host bus adapter (HBA) (not shown). It is through the HBA that host 14 can be physically connected to network 16. For reasons described below, host 14 also has a conventional IP network interface (not shown) and is connected to control station 20 via an IP network 42. Host 14 can establish a connection to IP network 42 using DHCP in the conventional manner.

Figure 2:
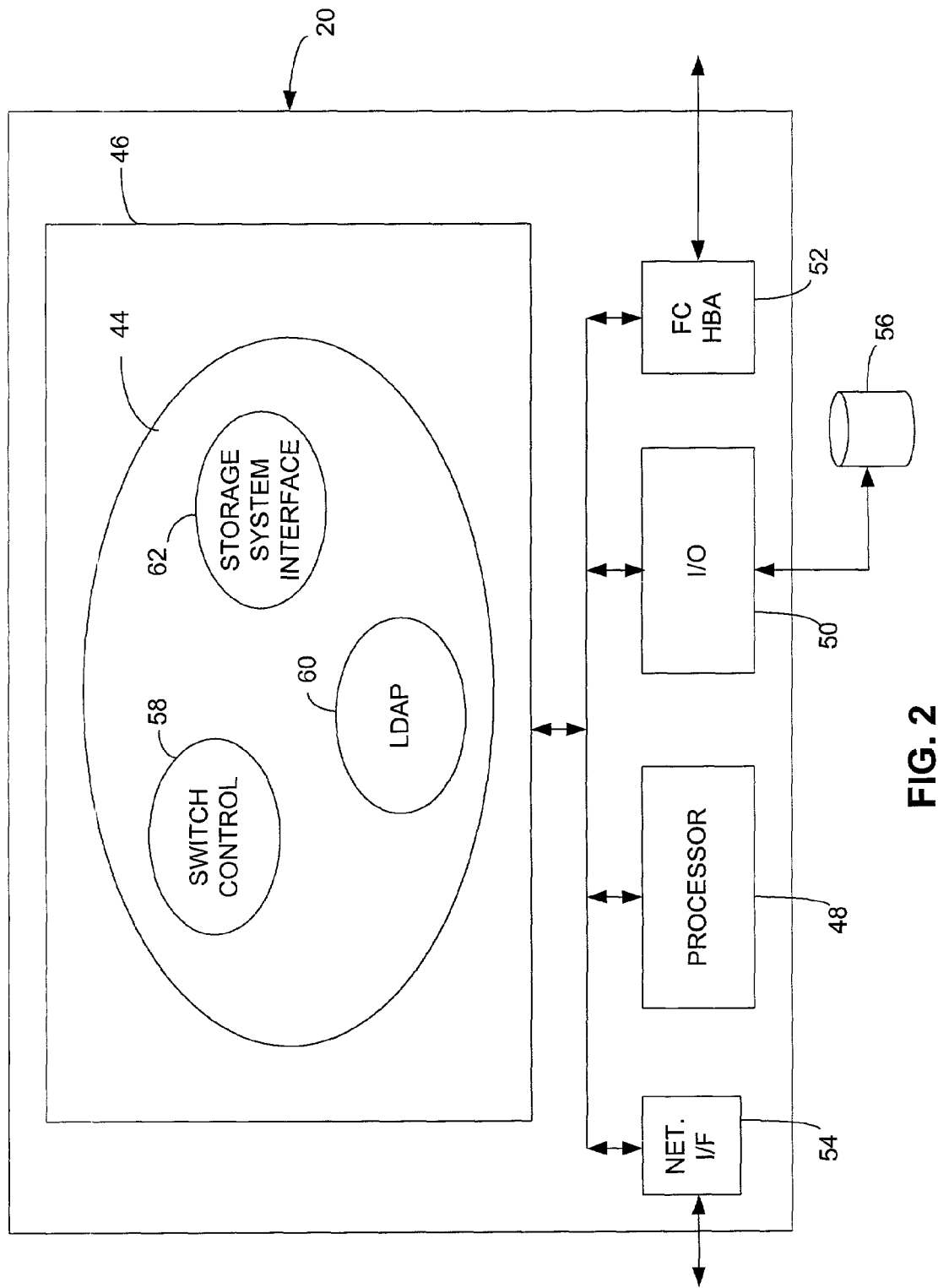
FIG. 2 is a block diagram of a control station computer.

As illustrated in FIG. 2, control station 20 includes software 44 that reflects the method illustrated in FIG. 3, described below. Control station 20 can be any suitable type of general-purpose computer, such as a personal computer or a workstation. As such, it includes a main memory 46, a processor 48, suitable input/output (I/O) logic 50, and other hardware and software elements of the types conventionally included in such computers. (Such additional hardware and software elements are not shown in FIG. 2 for purposes of clarity.) Control station 20 also includes software for controlling and maintaining SAN cloud 10 but is not shown for purposes of clarity. In addition, control station 20 includes a Fibre Channel HBA 52 for communicating with switch 18 and an IP network interface 54 for communicating with host 14. I/O logic 50 communicates with a database or similar data store operating under the well-known lightweight directory access protocol (LDAP) 56. Although illustrated as a separate device for purposes of clarity, LDAP 56 can alternatively be integrated with control station 20 in any suitable manner. Control station 20 also includes other I/O elements of the types commonly included in computers, such as a keyboard, monitor and mouse but are not shown for purposes of clarity.

Although software 44 can be modularized or otherwise structured in any suitable manner using any suitable software technology and written in any suitable programming language, its constituent elements can be conceptually understood to include at least a switch control element 58 for controlling switch 18, a LDAP lookup element 60 for controlling LDAP 56, and a storage system interface element 62. Although software elements 58, 60 and 62 are conceptually illustrated as residing in memory 46 for execution by processor 48, as persons of skill in the art understand, all software elements may not all reside in memory 46 simultaneously or in their entireties. Furthermore, as such persons understand, there are other software elements of control station 20 that are not shown for purposes of clarity, such as a suitable operating system, IP stack and other system software, but which would reside in memory 46 at some time at least in part. Also, control station 20 is not diskless, and software elements can be stored on a suitable disk storage device and retrieved on an as-needed basis in the conventional manner. This device can be the same as that of LDAP 56 or a different device. Note that the present invention can be embodied not only as a method and system but also as a computer program product that comprises a disk or other medium on which software 44 is stored or otherwise carried.

Figure 3:
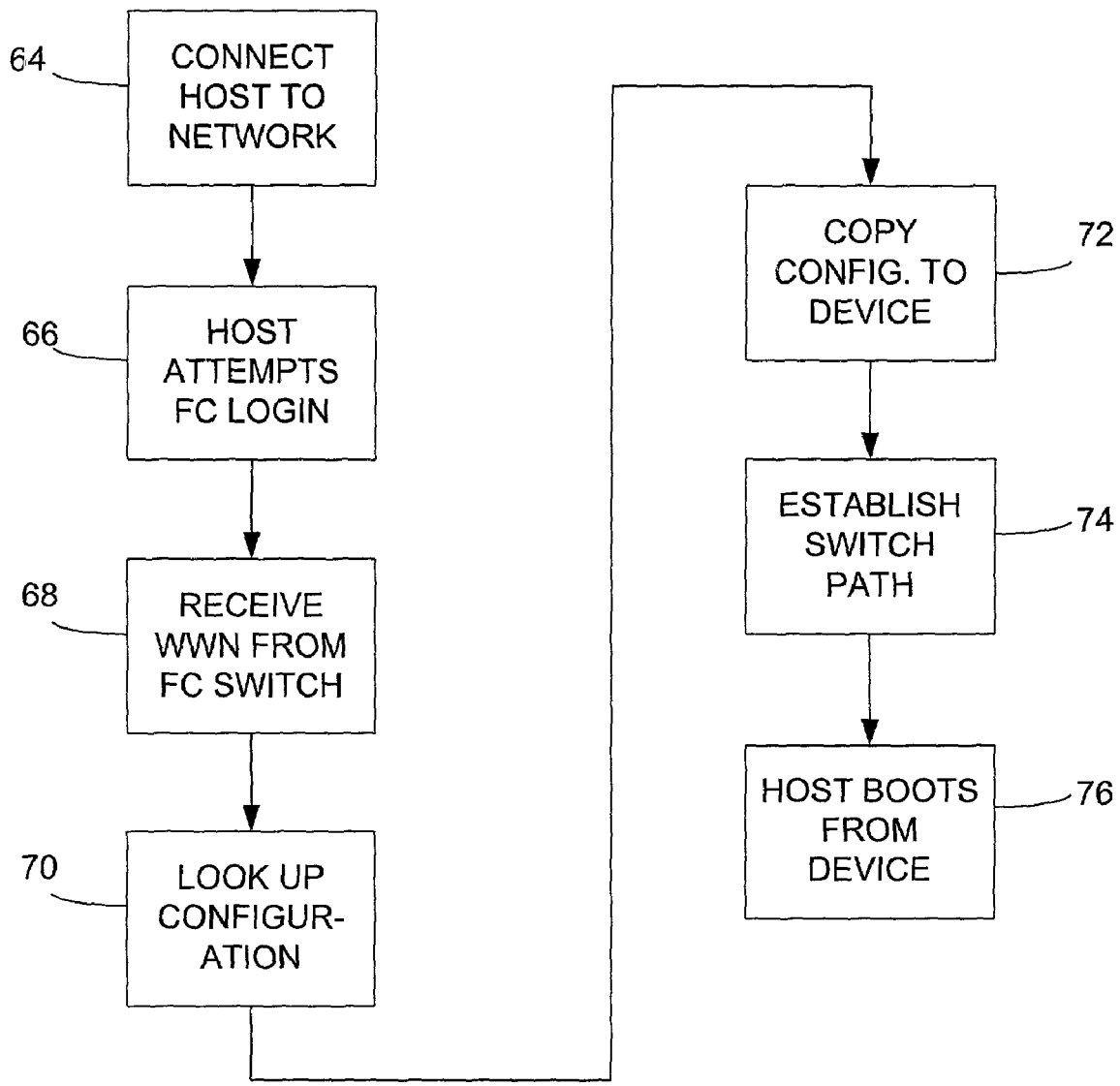
FIG. 3 is a flow diagram illustrating the method steps that occur upon connection of a diskless host to the SAN.

With regard to FIG. 3, at step 64 a system administrator or other person physically connects host 14 to Fibre Channel network 16, i.e., "plugs it in." In response to being plugged in to network 16, at step 66 the HBA of host 14 attempts to perform a Fibre Channel login process. The Fibre Channel login process is well-known in the art and therefore is not described in detail in this patent specification. Nevertheless, the following is a brief synopsis.

Attempting a login upon initial connection to a network is an inherent feature of all Fibre Channel HBAs because it is specified in the Fibre Channel ANSI standard. Fibre Channel uses a three byte address identifier as a network address, which is dynamically assigned during the login process. In the login process, the node port transmits a Fabric Login (FLOGI) frame to the well-known fabric address 'FFFFFE'. The fabric returns an Accept (ACC) frame back to the node port. As part of the login process, the host transmits its world wide name (WWN) to the fabric address. Every Fibre Channel HBA has a WWN, which is a 64-bit number assigned by the HBA manufacturer that uniquely defines the device. In other words, no two HBAs or other two Fibre Channel devices have the same WWN. A portion of the 64-bit WWN identifies the manufacturer.

Although host 14 itself has no operating system loaded at this point in the process, its HBA has an internal processor and read-only memory that can effect the login process independently of host 14. As part of the process of logging into switch 18, which in the illustrated embodiment of the invention constitutes the fabric, the HBA of host 14 transmits its WWN to switch 18. In conformance with the Fibre Channel standard, switch 18 sends a message to all other ports to the effect that a device is attempting to log in. The message also specifies the WWN of the device and the port into which it is attempting to log in.

At step 68 control station 20 receives the WWN from switch 18. The WWN is used in the present invention to identify an appropriate operating system and other configuration data for host 14. HBAs designed for use in a computer having one type of operating system cannot be installed in computers having a different operating system. For example, one HBA product may be usable only in a UNIX environment and another may be usable only in a WINDOWS NT environment. Stored in LDAP 56 is a correspondence between the WWN of each HBA likely to be used in the system and configuration data. At step 70 control station 20 uses the WWN as a lookup key in LDAP 56 and finds the corresponding configuration data. Thus, for example, control station 20 may determine in response to a certain WWN it received from host 14 that host 14 is of a type that requires a SOLARIS 7 operating system and other configuration data. The manufacturer identification portion of the WWN may be all that is needed to identify a corresponding operating system because in many cases all of a manufacturer's computers operate under the same type of operating system. Although LDAP 56 is used to perform the lookup in the illustrated embodiment of the invention, in other embodiments other suitable lookup or database mechanisms can be used.

Alternatively to steps 68 and 70, wherein control station 20 receives the WWN from switch 18 and uses it to look up corresponding configuration data, control station 20 can receive directly from host 14 via IP network 42 an indication of the proper configuration. In other words, host 14 can send a message directly to control station 20 to inform control station 20 of the proper operating system and other configuration data. In such an embodiment of the invention, some minimal operating software, such as the Microsoft Disk Operating System (MS-DOS or PC-DOS) and an IP stack, can be loaded from a floppy disk or CD-ROM (not shown) into host 14 before plugging host 14 into network 16 at step 64. The operating software is sufficient to enable host 14 to perform the initial task of transmitting a configuration message to control station 20. When host 14 is ultimately provided access to the proper operating system, as described below, the floppy disk or CD-ROM can be removed and host 14 re-booted.

In a still further alternative embodiment, which is somewhat of a hybrid between the two described above, host 14 can send a message to control station 20 via IP network 42 to inform control station 20 that host 14 is attempting to log in to switch 18. In response, control station 20 can receive the WWN from switch 18. Thus, in such an embodiment of the invention, IP network 42 is used to notify control station 20 of the login attempt but not to identify a configuration. Control station 20 obtains the configuration information in the same manner described above with regard to steps 68 and 70.

Note that each configuration, including an operating system and any other configuration data, is stored in a corresponding one of devices 22, 24, 26, 28 and 30. At step 72 control station 20 copies the configuration identified at step 70 from the corresponding one of devices 22, 24, 26, 28 and 30 to its counterpart device 22', 24', 26', 28' or 30'. Although not essential, this step is performed to preserve the integrity of the original copy of the configuration data. In other words, the configurations on devices 22, 24, 26, 28 and 30 are preserved as so-called "gold" copies, and the copies on devices 22', 24', 26', 28' and 30' become working copies. The working copies can then be altered to suit host requirements, such as name and IP address.

At step 74 control station 20 sends a message to switch 18 to establish a connection between two ports. One of the ports identified in the message is that which is coupled to the one of devices 22', 24', 26', 28' and 30' on which the identified configuration data are stored. The other port identified in the message is that which is coupled to the logged-in host 14 that requires the configuration data. Switch 18 thus establishes a path between host 14 and the one of devices 22', 24', 26', 28' and 30' on which its configuration data are stored. With the path established in this manner, host 14 has access to the operating system and other configuration data. At step 76 host 14 can boot from this copy of the operating system and otherwise configure itself in preparation for normal operation.

A system administrator need only plug host 14 into network 16, and host 14 will be ready to use as soon as the above-described steps have occurred. If host 14 requires replacement, or if an additional host 14 is to be added to the SAN, no time is spent by the system administrator installing software or otherwise configuring the new host 14.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A system for automatically configuring a diskless host computer upon being physically connected to a network, comprising:

at least one diskless host computer that automatically boots an operating system as a result of being connected to the network, wherein the diskless host computer was not previously connected to the network;

a storage system on which are stored a plurality of host configurations, each configuration including an operating system;

a switch coupled to each diskless host computer and having a plurality of ports, each port coupled to the storage system; and a control station computer configured for:

monitoring for receipt a World Wide Name (WWN) transmitted by the diskless host computer to the switch in accordance with a Fibre Channel log-in protocol, accessing, in response to receiving the WWN, a database comprising a correspondence between a WWN of each of a plurality of diskless host computers and a configuration associated with the corresponding diskless host computer in order to look up a configuration corresponding to the received WWN transmitted by the diskless host computer, said configuration identifying the operating system associated with the diskless host computer, and directing the switch to provide the diskless host computer access to a storage device on which the operating system identified in the configuration is stored;

wherein the storage system is configured to copy the operating system to the storage device, to which the switch provides the diskless host computer with access, from another device of the storage system, said another device configured to maintain an unaltered copy of the operating system; and wherein the database comprises a correspondence between a WWN of at least one diskless host computer not previously connected to the network and a configuration associated with the corresponding diskless host computer.

2. The system claimed in claim 1, wherein the control station computer queries the Fibre Channel switch for the WWN and looks up the configuration in the database in response to the WWN.

3. The system claimed in claim 1, wherein the database operates under the lightweight directory access protocol (LDAP).

4. A method for automatically booting a diskless host computer upon being connected to a Fibre Channel network, comprising:

physically connecting the diskless host computer to the network, wherein the diskless host computer was not previously connected to the network;

receiving, at a Fibre Channel switch, a World Wide Name (WWN) from the diskless host computer in accordance with a Fibre Channel log-in protocol;

looking up a configuration corresponding to the WWN received from the diskless host computer, wherein looking up a configuration corresponding to the WWN received from the diskless host computer further comprises: querying, by a control station computer, the Fibre Channel switch for the WWN received from the diskless host computer; and accessing, by the control station computer in response to receiving the WWN, a database comprising a correspondence between a WWN of each of a plurality of diskless host computers and a configuration associated with the corresponding diskless host computer in order to look up the configuration corresponding to the obtained WWN, said configuration identifying an operating system associated with the diskless host computer, wherein the database comprises a correspondence between a WWN of at least one diskless host computer not previously connected to the network and a configuration associated with the corresponding diskless host computer;

copying the operating system identified in the configuration to a storage device from another storage device, said another storage device configured to maintain an unaltered copy of the operating system;

providing the diskless host computer access to the storage device, to which the operating system identified in the configuration was copied; and the diskless host computer booting from the operating system copied to and stored on the storage device in response to being connected to network.

5. The method claimed in claim 4, wherein the control station queries the Fibre Channel switch in response to a notification received from the host via an Internet Protocol (IP) network.

6. The method claimed in claim 5, wherein the host connects to the IP network using a DHCP protocol.

7. The method claimed in claim 4, wherein the database uses the lightweight directory access protocol (LDAP).

8. A method for automatically booting a diskless computer upon being physically connected to a network, comprising:

physically connecting the diskless computer to the network, wherein the diskless computer was not previously connected to the network;

transmitting, in response to being physically connected to the network, a World Wide Name (WWN) from the diskless computer;

receiving the WWN by a control station computer;

querying, by the control station computer, in response to receiving the WWN, a database with the identifier received to determine an operating system associated with the diskless computer, wherein the database comprises a correspondence between WWNs of each of a plurality of diskless computers and a configuration associated with the corresponding diskless computer, said configuration identifying an operating system, wherein the database comprises a correspondence between the WWN of at least one diskless computer not previously connected to the network and the configuration associated with the corresponding diskless computer;

copying the operating system identified in the configuration to a storage device from another storage device, said another storage device configured to maintain an unaltered copy of the operating system;

copying the identified operating system from the storage device, to which the operating system identified in the configuration was copied, to the diskless computer over the network; and booting, as a result of being physically connected to the network, the diskless computer from the identified operating system.

9. The method claimed in claim 8, wherein the network comprises an IP network.

10. The method claimed in claim 9, wherein the diskless computer connects to the IP network using a DHCP protocol.

11. The method claimed in claim 8, wherein the network comprises a Fibre Channel network.

12. The method claimed in claim 11, wherein the WWN is unique to an adapter used to connect the diskless computer to the network.

* * * * *